UNITED STATES PATENT OFFICE.

WILLIAM B. D. PENNIMAN, OF BALTIMORE, MARYLAND, ASSIGNOR, BY MESNE ASSIGNMENTS, TO WHITNEY YEAST CORPORATION, OF BOSTON, MASSACHUSETTS, A CORPORATION OF NEW YORK.

METHOD OF MAKING DRY YEAST.

1,386,359.      Specification of Letters Patent.      Patented Aug. 2, 1921.

No Drawing. Application filed March 6, 1918, Serial No. 220,801. Renewed June 10, 1921. Serial No. 476,604.

*To all whom it may concern:*

Be it known that I, WILLIAM B. D. PENNIMAN, a citizen of the United States of America, residing in the city of Baltimore, State of Maryland, have invented certain new and useful Improvements in Methods of Making Dry Yeast, of which the following is a specification.

This invention relates to a process for making dry alcoholic yeast developed in connection with the Whitney process described in United States Patent No. 1,306,569, dated June 10th, 1919, the application for which was copending with the present application, and which patent is the property of the assignee of the present application.

The object of the invention is to produce a yeast which will keep for a considerable period and retain practically its full strength when packed in an ordinary paper container and will not deteriorate when the packages are opened until there has been reasonable time to consume the contents.

While the product is termed a dry yeast, it contains the moisture necessary to the life of the yeast cells but not enough moisture to support fermentation at ordinary temperatures. Preferably about 10% of moisture is present.

To carry out this invention, I take compressed yeast which usually contains about 20% of live yeast cells and 80% of moisture. It may and generally does also contain starch or other filler. To this material I add a further quantity of insoluble filler, as starch or flour, and soluble filler, as dextrin or the like, which will not be injurious to the yeast plant or materials. The mixture is then agitated until all the ingredients are thoroughly incorporated; 60° F. or below is a good temperature for this operation. The material is next transferred to a vacuum container and dried, preferably at a temperature sufficiently low to check fermentation until the content of moisture is reduced as just described. Ten per cent. (10%) of moisture is a good average. The vacuum drying usually takes two hours or less, the pressure being under the conditions recited less than one-half an inch of mercury. Otherwise expressed, the vacuum is preferably the highest obtainable with a commercial air pump. Such a vacuum has no harmful effect on the yeast cells.

In general two parts of insoluble filler, such as starch, should be used with each part of live yeast cells and to this one-half part of soluble filler is added. As the most easily available materials for the insoluble filler, I use starch or flour, and as the soluble ingredient, glucose or dextrin. A small percentage of soluble inorganic salts, such as ammonium phosphate, potassium nitrate, and magnesium phosphate, may be added to the mixture. This assists materially in the revivification of the yeast plant. To prevent undue fermentation during drying, this is performed at a low temperature, say 50° to 60° F., the drying period being whatever is found necessary to reduce the moisture to the small percentage requisite to the vitality of the yeast cells in the finished product as and under the conditions already stated.

The dried yeast as it contains only sufficient moisture to maintain the vitality of the yeast and not enough to support putrefactive fermentation, will keep for several months, even in ordinary paper containers, and owing to the manner of drying retains a high percentage of vitality. The yeast cells are protected by the filler used. Though this does not in any way affect the action of the yeast in the dough, it makes the material readily workable, both in mixing and in the operation of desiccation. The yeast when thus preserved in a dormant condition of dryness is immediately revived or revitalized when wet prior to the bread mixing and baking operation.

Having thus described my invention, what I claim and desire to secure by Letters Patent is:

1. In the process of making dry yeast, the improvement which comprises the mixing of live yeast cells which have been separated from the culture with soluble and insoluble filler in a moist state, and subjecting the material to agitation, and drying *in vacuo* at a low temperature, *i. e.*, sufficiently low to prevent rapid fermentation.

2. In the process of making dry yeast, the improvement which consists in mixing at a temperature below that most favorable to fermentation, moist yeast cells which have been separated from the culture with comminuted filler material and inorganic salts, and then subjecting the material to drying *in vacuo* at a low temperature, around 50° to 60° F.

3. In the process of making dry yeast, the improvement which consists in mixing at substantially 50° to 60° F., moist yeast cells which have been separated from the culture with comminuted filler material and inorganic salts, and then subjecting the material to drying *in vacuo* at a low temperature, around 50° to 60° F.

Signed by me at Baltimore, Maryland, this 1st day of March, 1918.

WILLIAM B. D. PENNIMAN.

Witnesses:
ZELLA KUHN,
ALICE G. DONEGAN.